(12) United States Patent
Wautier et al.

(10) Patent No.: US 7,767,765 B2
(45) Date of Patent: Aug. 3, 2010

(54) METHOD FOR MODIFYING GRAFT POLYOLEFINS, COMPOSITIONS AND ARTICLES COMPRISING POLYOLEFINS MODIFIED THUS

(75) Inventors: Henri Wautier, Braine-le-Comte (BE); Fernand Gauthy, Wemmel (BE); Dino Manfredi, Lummen (BE)

(73) Assignee: Addcomp Holland BV, Nijverdal (NL)

( * ) Notice: Subject to any disclaimer, the term of this patent is extended or adjusted under 35 U.S.C. 154(b) by 568 days.

(21) Appl. No.: 10/546,756

(22) PCT Filed: Feb. 27, 2004

(86) PCT No.: PCT/EP2004/002082

§ 371 (c)(1),
(2), (4) Date: Mar. 24, 2006

(87) PCT Pub. No.: WO2004/076501

PCT Pub. Date: Sep. 10, 2004

(65) Prior Publication Data

US 2006/0160953 A1    Jul. 20, 2006

(30) Foreign Application Priority Data

Feb. 28, 2003  (FR) .................................. 03 02509
Sep. 29, 2003  (FR) .................................. 03 11394

(51) Int. Cl.
*C08F 8/44* (2006.01)
*C08F 8/00* (2006.01)
*C08F 255/00* (2006.01)
*C08F 255/02* (2006.01)
*C08F 220/00* (2006.01)

(52) U.S. Cl. ..................... 525/327.8; 525/242; 525/285; 525/367; 525/370

(58) Field of Classification Search .................. 525/242, 525/191, 285, 327.8, 369, 500, 327.4, 360
See application file for complete search history.

(56) References Cited

U.S. PATENT DOCUMENTS

| 3,886,227 | A  | 5/1975  | Vanbrederode et al. |
| 4,371,583 | A  | 2/1983  | Nelson |
| 6,586,532 | B1 | 7/2003  | Gauthy |
| 2002/0107329 | A1 | 8/2002 | Ding et al. |
| 2003/0092844 | A1 | 5/2003 | Pradel |
| 2003/0204019 | A1* | 10/2003 | Ding et al. .................. 525/191 |

FOREIGN PATENT DOCUMENTS

| EP | 307 684    | 3/1989  |
| GB | 1 335 791  | 10/1973 |
| JP | 5-105790   | 4/1993  |
| WO | 00/66641   | 11/2000 |
| WO | 02/36651   | 5/2002  |

OTHER PUBLICATIONS

U.S. Appl. No. 11/577,412, filed Apr. 18, 2007, Piernot et al.
U.S. Appl. No. 10/573,652, filed Mar. 28, 2006, Wautier et al.
U.S. Appl. No. 10/573,807, filed Mar. 28, 2006, Wautier et al.

* cited by examiner

Primary Examiner—Irina S Zemel
Assistant Examiner—Jeffrey Lenihan
(74) Attorney, Agent, or Firm—Oblon, Spivak, McClelland, Maier & Neustadt, L.L.P.

(57) ABSTRACT

Process for modifying a polyolefin grafted with acid or anhydride groups, by at least partial neutralization of these groups with at least one neutralizing agent comprising an organic salt (1) that releases an organic acid (I) during the neutralization, according to which the organic acid (I) derived from the neutralization of the grafted polyolefin is reacted with at least one inorganic salt (2).

Modified polyolefin (that can be) obtained by the process described above.

Polymeric composition containing (A) at least one polymer, and (B) at least one modified polyolefin (that can be) obtained by the process above.

Article comprising the modified polyolefin or the composition described above.

17 Claims, No Drawings

METHOD FOR MODIFYING GRAFT POLYOLEFINS, COMPOSITIONS AND ARTICLES COMPRISING POLYOLEFINS MODIFIED THUS

The present invention relates to a process for modifying grafted polyolefins, and also to the resulting polyolefins.

A problem often posed by polymers in general, and polyolefins in particular, is their insufficient melt strength during their processing by extrusion.

It is well known that the melt strength of polyethylene (PE), but especially of polypropylene (PP), defined by a high elongational viscosity, is insufficient for certain types of processing, such as extrusion foaming, extrusion blow-moulding, thermoforming and blow-moulding, in particular 3D blow-moulding. In addition, for certain applications such as foaming and adhesion, for example, it may prove to be advantageous for the viscosity to increase (in particular exponentially) as a function of time. This phenomenon is called elongational hardening (EH).

Solutions proposed in order to solve this problem consist in branching the macromolecular structure of the PE or PP by creating covalent bonds between the macromolecules. However, in practice, branched resins produced by covalent coupling all suffer from a tendency for the branching to degrade under the influence of the shear inherent in the processing. In addition, substantial irreversible covalent branching (or crosslinking) results in breaks in flow that limit productivity and/or the quality of the finished product.

In order to be able to increase the connection density between macromolecules without being limited by the crosslinking, it is possible to introduce a substantial portion of the branchings via reversible ionic bonds. This makes it possible to increase the melt strength while at the same time maintaining the thermoplastic nature, and also makes it possible, under correctly chosen conditions, to obtain EH.

Thus, application WO 00/66641 in the name of Solvay describes a process according to which a polyolefin grafted using a carbonyl and/or an acid anhydride, from which the "free" (non-grafted) grafting monomer has been removed beforehand, is subjected to neutralization with at least one compound comprising alkali metal cations, alkaline earth metal cations and transition metal cations. This process has the advantage of providing a non-crosslinked resin (typically having a content of products insoluble in xylene at 130° C. of less than 1%) having, despite everything, a high level of EH. However, it has the disadvantage of providing resins whose fluidity is difficult to optimize, i.e. of producing either resins that are relatively fluid (with a relatively high MFI), the melt strength of which is insufficient for certain applications, or resins having an MFI that is too low, or even virtually zero, which are no longer capable of melt processing.

In addition, according to a preferred variant of this invention, the products of the neutralization reaction (organic acid in the case of the use of organic salts as neutralizing agents) are removed from the finished product by stripping or by degassing in order to shift the equilibrium of the neutralization reaction. However, the applicant has noted that the removal of neutralization by-products is difficult and incomplete in the case of organic acids such as acetic acid, for example. Now, the use of organic metal salts as neutralizing agents often gives good results in terms of elongational hardening. It should also be noted that certain organic acids (such as acetic acid and lactic acid, for example) can lead to the finished product having an unpleasant smell, and to organoleptic problems. Finally, the use of organic metal salts also induces, in certain cases, a yellowing that is undesirable from an aesthetic point of view, which yellowing is accentuated during subsequent processing.

The aim of the present invention is consequently to propose a process for modifying grafted polyolefins exhibiting improved properties with regard especially to the melt strength, and in particular to the melt viscosity, and which makes it possible, in certain cases, to improve the organoleptic properties, the colour and the odour of these polyolefins.

To this effect, the present invention relates to a process for modifying a polyolefin grafted with acid or anhydride groups, by at least partial neutralization of these groups with at least one neutralizing agent comprising an organic salt (1) that releases an organic acid (I) during the neutralization, according to which the organic acid (I) derived from the neutralization of the grafted polyolefin is reacted with at least one inorganic salt (2) [process (P)].

The modified polyolefins obtained by means of the process (P) in accordance with the present invention [modified polyolefins (B1)] exhibit improved properties by virtue of the use of the inorganic salt (2). In fact, first of all, the use of this inorganic salt (2) makes it possible to remedy the abovementioned problems of yellowing. Next, the reaction of the inorganic salt (2) with the organic acid (I) forms, firstly, an inorganic acid (II) which can be partially eliminated by stripping or degassing and, secondly, an organic salt (3) which does not disturb the proper functioning of the process and even, in certain cases (according to the choice of reactants: see below), makes it possible to improve it. The fact that the organic acid is eliminated from the system makes it possible at the same time to eliminate the organoleptic problems. In addition, the fact that this acid is eliminated shifts the equilibrium of the reaction to neutralize the acid or anhydride functions and therefore promotes this neutralization. This advantage (shift in equilibrium reaction) can even be accentuated with the choice of reactants (organic (1) and inorganic (2) salts) resulting in an organic salt (3) which is eliminated from the reaction medium (either by precipitation, or by chemical reaction with certain compounds present in the reaction medium). The adjusting of several reactants therefore makes it possible to readily promote the neutralization reaction. Finally, the applicant has noted that adding an inorganic salt after or at the same time as an organic salt makes it possible to reduce the size of the residual aggregates of inorganic salt and, in doing so, to improve the mechanical properties of the modified polyolefin obtained. These aggregates are in fact generally less than 500 nm, or less than 300 nm, and even less than 100 nm in size, which is clearly finer than the aggregates of inorganic salt obtained when said salt is used alone as neutralizing agent.

The polyolefins that can be used in the process according to the invention are polymers of linear olefins containing from 2 to 8 carbon atoms, such as ethylene, propylene, 1-butene, 1-pentene, 1-hexene and 1-octene, and they are grafted with acid or anhydride functions, for example by the free-radical process. These olefins preferably contain from 2 to 6 carbon atoms, more particularly from 2 to 4 carbon atoms. They can be selected from homopolymers of the abovementioned olefins and from copolymers of these olefins, in particular copolymers of ethylene or of propylene with one or more comonomers, and also from blends of such polymers. The comonomers are advantageously chosen from the olefins described above, from diolefins comprising from 4 to 18 carbon atoms, such as 4-vinylcyclohexene, dicyclopentadiene, methylene norbornene and ethylidene norbornene, 1,3-butadiene, isoprene or 1,3-pentadiene, and from styrene monomers such as styrene and alpha-methylstyrene. The content of weight of units formed from the comonomers in the polyolefins is advantageously less than 50%, preferably less than 30%, and particularly preferably less than 10% by weight. It is understood that the term "polyolefin" is equally intended to denote the polymers as described above taken in isolation, and blends thereof.

Preferably, the polyolefin is chosen from polymers of ethylene and/or of propylene (i.e. the polyolefin comprises repeat units derived from ethylene and/or from propylene). Particularly preferably, the polyolefin is chosen from (i) ethylene homopolymers, (ii) propylene homopolymers, (iii) copolymers composed of repeat units derived from ethylene and from propylene, (iv) terpolymers composed of repeat units derived from ethylene, from propylene and from a diolefin comprising from 4 to 18 carbon atoms commonly called EPDM rubbers, and also (v) blends of the abovementioned polyolefins with one another. The propylene homopolymers and the copolymers composed predominantly (by weight) of repeat units derived from propylene and to a minor extent (by weight) of repeat units derived from ethylene are most particularly preferred.

According to a particular embodiment of the process in accordance with the invention, the polyolefin is block copolymer, preferably a block copolymer comprising repeat units derived from ethylene and/or from propylene. By way of examples of block copolymers, mention may be made of AB diblock copolymers and ABA triblock copolymers, where the A blocks are blocks of polystyrene homopolymer and the B block are blocks of a copolymer composed, firstly, of repeat units derived from ethylene and, secondly, of repeat units derived from propylene and/or from a diolefin comprising from 4 to 18 carbon atoms, such as butadiene, that are optionally hydrogenated (for example, the repeat units derived from butadiene may be hydrogenated to butylene repeat units). According to this particular method of implementing of the process according to the invention, and by exception, the content by weight of units formed from comonomers other than ethylene and propylene is advantageously at least 10%, preferably at least 20% by weight; in addition, it is advantageously less than 75%, and preferably less than 50% by weight.

According to the present invention, the grafted polyolefin is preferably semicrystalline, i.e. it has at least one melting point.

The acid or anhydride groups that are grafted onto these polyolefins are generally chosen from unsaturated mono- or dicarboxylic acids and their derivatives, and unsaturated mono- or dicarboxylic acid anhydrides and their derivatives. These groups preferably comprise from 3 to 20 carbon atoms. As typical examples, mention may be made of acrylic acid, methacrylic acid, maleic acid, fumaric acid, itaconic acid, crotonic acid, citraconic acid, maleic anhydride, itaconic anhydride, crotonic anhydride and citraconic anhydride. Maleic anhydride is most particularly preferred. In particular, it gives good results in the case of polymers of ethylene and/or of propylene.

The amount of acid or anhydride groups grafted is generally sufficient to allow an improvement in the properties (melt strength and EH) of the grafted polyolefin; it is generally greater than or equal to 0.01% by weight relative to the polyolefins, or even greater than or equal to 0.02% by weight, or better still greater than or equal to 0.03% by weight. In practice, this amount is, however, generally less than or equal to 2.0% by weight, preferably less than or equal to 1.5%, and better still less than or equal to 1.0% by weight. In fact, the grafting of the acid or anhydride groups is generally initiated by a radical generator, the amount of which should be limited so as to avoid having to deal with a resin that is too fluid in the case of a propylene polymer, or not fluid enough in the case of an ethylene polymer. As radical generators that are normally used, mention may be made of t-butylcumyl peroxide, 1,3-di (2-t-butylperoxyisopropyl)benzene, 2,5-dimethyl-2,5-di(t-butylperoxy)hexane, di(t-butyl)peroxide and 2,5-dimethyl-2,5-di(t-butylperoxy)-3-hexyne. 2,5-dimethyl-2,5-di-t-butylperoxyhexane (DHBP) gives rise to grafted polyolefins that give good results in the process according to the present invention.

The grafted polymers that can be used in the process according to the invention are most commonly chosen from homopolymers and copolymers of ethylene and/or of propylene, the melt flow index (MFI) of which is greater than or equal to 1, preferably greater than or equal to 5, particularly preferably greater than or equal to 10. The MFI of these resins is, however, generally less than or equal to 5000 dg/min, preferably less than or equal to 4000 dg/min, particularly preferably less than or equal to 3000 dg/min. The MFI of the polyolefins is measured at 230° C. under a weight of 2.16 kg for propylene polymers according to ASTM standard D 1238 (1986) and at 190° C. under a weight of 5 kg for ethylene polymers according to ISO standard 1133 (1991).

The grafted polyolefins according to the present invention preferably contain little free (non-grafted) monomer, for example an amount less than or equal to 500 ppm, or even less than or equal to 400 ppm, or better still less than or equal to 200 ppm.

According to the invention, the neutralization of the acid or anhydride groups is carried out with at least one neutralizing agent comprising an organic salt. Preferably, this organic salt is a salt that is liquid at the processing temperature. The applicant has in fact noted that such salts give better results in terms of reactivity. Examples of salts that are liquid at the usual processing temperatures are Li acetate and Li formate (respective melting points ($T_m$) of 53-56° C. and 94° C.), Mg acetate ($T_m$=72-75° C.), K formate ($T_m$=165-168° C.), Zn acetate and Zn stearate ($T_m$=237° C. and 128-130° C.), Cu acetate ($T_m$=115° C.), Na lactate and Na formate ($T_m$ less than ambient temperature and equal to 261° C. respectively), ammonium acetate and ammonium formate ($T_m$=112-114 and 119-121° C.). Zn acetate and Na lactate give good results, in particular respectively with polymers of ethylene and/or of propylene.

In the process according to the invention, the organic salt and the inorganic salt can be introduced either at the same time, or in a deferred way. Simultaneous introduction is preferred when the organic salt is Na lactate, whereas deferred introduction (organic salt then inorganic salt) is preferred in the case of Zn acetate. This is because the latter is unstable in an aqueous solution with a pH of greater than 4 (precipitation of $Zn(OH)_2$) and is therefore preferably introduced in an acidic solution and not in a basic solution.

The amount of organic salt added depends on its nature, on the nature of the grafted polyolefin and on the envisaged use (and therefore on the desired properties) of the modified polyolefin. Those skilled in the art can readily optimize, by experiment, the amount of salt according to these parameters. However, the organic salt is generally used in an amount that is approximately the stoichiometric value relative to the acid or anhydride groups. In the case of propylene polymers, the amount of organic salt added will generally be greater than or equal to 0.5 molar equivalent (mol. eq.) relative to the number of acid or anhydride functions, or even greater than or equal to 0.75 mol. eq., and in certain cases, greater than or equal to 1 mol. eq. In the case of ethylene polymers, this amount will generally be less than or equal to 3 mol. eq., or even less than or equal to 2 mol. eq., and preferably less than or equal to 1.5 mol. eq.

The organic salt is generally introduced into the grafted polyolefin in the form of an aqueous solution, which is moreover particularly advantageous in the case of polyolefins grafted with anhydride functions. This is because the water contained in this solution is then used for the hydrolysis of this anhydride to a diacid, which is the form that effectively reacts with the organic salt so as to release the corresponding organic acid.

The inorganic salt (2) that serves to capture the organic acid (I) in the process according to the invention is preferably, as explained previously, chosen according to the nature of the organic salt (1) and of the organic acid (I), so as to give, respectively, an inorganic acid (II) and an organic salt (3) that are readily eliminated from the reaction medium. Thus, care will preferably be taken to ensure that the inorganic acid (II) is a very volatile and/or unstable acid that decomposes at the processing temperature so as to release at least one gas (for instance carbonic acid) and, in so doing, shift the equilibrium of the reaction between the organic acid (I) and the inorganic salt (2). Similarly, care will preferably be taken to ensure that the organic salt (3) is eliminated from the reaction medium by any means (it may, for example, either be insoluble at the processing temperature, or may be identical to the organic salt (1), in which case it will react with the acid or anhydride functions not yet neutralized on the grafted polyolefin).

The inorganic salts (2) may be liquid at the processing temperature; however, good results have been obtained with solid salts. Inorganic salts that are suitable for the process according to the invention are alkali metal carbonates, alkaline earth metal carbonates and rare earth metal carbonates, and in particular Na carbonate and K carbonate. Na carbonate gives good results, in particular when the organic salt used is Zn acetate or an Na lactate. It makes it possible in particular to remedy the organoleptic problems and to decrease the yellowing in a particularly effective manner.

The amount of inorganic salt (2) added should be sufficient to neutralize the organic acid released. Thus, an amount of less than or equal to 5 mol. eq., or even less than or equal to 4 mol. eq., and preferably less than or equal to 3 mol. eq., relative to the number of acid or anhydride functions of the grafted polyolefin, will preferably be added.

The inorganic salt (2) is preferably also introduced into the grafted polyolefin in the form of an aqueous solution, still so as to benefit from the effect of hydrolysis of the water on the anhydride functions, where appropriate.

Care will be taken to optimize the concentration of the aqueous solutions of organic and inorganic salts so as to prevent precipitation of solid particles in the device for introducing these solutions into the grafted polyolefin, while at the same time limiting as much as possible to amount of water (since the latter must subsequently be eliminated).

In order to carry out the process according to the present invention, all the devices ("reactors") known for this purpose can be used. Thus, it is possible to work, without distinction, with external mixers or internal mixers, or static mixers. Internal mixers are most suitable and, among these, Brabender® batch mixers and continuous mixers, such as extruders, that consist mainly of at least one screw rotating in a barrel. In the process according to the invention, the extruder that can be used may be a single-screw extruder, or a counter-rotating or co-rotating twin-screw extruder, of self-cleaning type. Self-cleaning twin-screw extruders give good results.

An extruder within the meaning of this variant of the present invention comprises at least, in order, the following components: a feed zone, a melt zone, a reactant injection zone, a homogenization/reaction zone, a degassing zone and a zone for extracting the melt. Preferably, the degassing zone comprises two vents: a first for degassing under atmospheric pressure and a second for stronger degassing, under vacuum. Preferably, the latter degassing is carried out under a high vacuum, for example less than 10 mbar, or even less than 5 mbar, a maximum value of 2 mbar giving good results. The organic salt is generally introduced into the injection zone and, in the case of deferred introduction of an inorganic salt, the latter is advantageously introduced between the two degassing vents. The extraction zone may also be followed by a granulator or a device that gives the extruded material a given form (film for example).

An extruder that is particularly preferred for carrying out the process according to the invention is made of a corrosion-resistant alloy. A particularly preferred alloy is an alloy consisting predominantly of nickel or of cobalt.

In the process according to the invention, the organic and inorganic salts are introduced into the injection zone(s) by any known device. Preferably, they are introduced using a high-pressure injector which is preferably based on a corrosion-resistant alloy as described above.

In the process according to the invention, the grafted polyolefin may be fed into the chosen reactor by any known means. In the case of an extruder, it may be fed into the feed zone by means of a weigh feeder. Alternatively, it may be fed in melt form via another extruder, for example the one in which the grafting was carried out by reactive extrusion. Finally, the grafting by reactive extrusion and the modifying of the grafted polyolefin can take place in the same extruder. However, the latter two variants have the drawback of reducing production rates since, where appropriate, the free monomer than has to be removed from the grafted polyolefin on line.

The temperature at which the process according to the invention is carried out is generally above the melting point and below the decomposition temperature of the grafted polyolefin, and preferably above the melting point of the organic salt in the zone where the latter reacts with the grafted polyolefin. This temperature will generally be at least 180° C., most commonly at least 190° C., in particular at least 200° C. Generally, the process is carried out at a temperature not exceeding 400° C., most commonly not exceeding 300° C. and more particularly not exceeding 250° C.

The amount of time required to carry out the process in accordance with the invention is generally from 10 seconds to 10 minutes, or even from 30 seconds to 5 minutes.

In the course of the process, one or more usual polyolefin additives, such as for example stabilizers, antioxidants, antistatic agents, organic dyes or mineral pigments, and fillers, etc., may be incorporated at any moment, provided that they do not interfere with the neutralization of the acid or anhydride groups. Preferably, and precisely so as to avoid this interference, when the process takes place in an extruder, the possible additive(s) will be added after the second degassing, just before the outlet.

In a preferred method of implementing the process according to the invention, at least one stabilizer is added during the process. Preferably, the stabilizer used in this variant of the process according to the present invention is chosen from compounds comprising a sterically hindered phenol group, from phosphorus compounds and from mixtures thereof. These are, for example, substances such as 1,3,5-trimethyl-2,4,6-tris(3,5-t-butyl-4-hydroxybenzyl)benzene, pentaerythritol tetrakis-(3,5-di-t-butyl-4-hydroxyphenylpropionate) or tris-(2,4-di-t-butylphenyl)phosphite, or the mixture of pentaerythrityl tetrakis-(3,5-di-t-butyl-4-hydroxyphenylpropionate) and of tris-(2,4-di-t-butylphenyl)phosphite, preferably in equal amounts. The preferred stabilizer is 1,3,5-trimethyl-2,4,6-tris(3,5-t-butyl-4-hydroxybenzyl)benzene.

The present invention also relates to modified polyolefins (PO) for whose production the process according to the invention is particularly suitable. The applicant has in fact noted that the process according to the invention makes it possible to obtain modified polyolefins comprising acid or anhydride groups with a high degree of neutralization, exhibiting a particularly improved melt strength characterized by an exponential increase in elongational viscosity (elongational hardening or EH) and by an ideal MFI (less than a given value), while at the same time having little or no crosslinking (i.e. having a content of products insoluble in xylene at 130° C. of less than 1%). According to this variant of the invention, the term "elongational hardening" is intended to denote an exponential increase in the elongational viscosity (expressed in kPa.s) measured in the molten state (in particular at 190° C. for PE resins and at 230° C. for PP resins), as a function of time (expressed in s) and for an elongation rate (expressed in $s^{-1}$) of 1. In general, the elongational viscosity of the modified polyolefins according to the invention ranges from less than 20 to several hundred, or even to more than 1000 kPa.s, after 2 to 3 s.

This combination of properties is exceptional and is related, firstly, to the fact that organic acid (I), that plays the role of plasticizer at high doses, is eliminated by reaction with the inorganic salt (2); and, secondly, to an increased content of ionic aggregates.

Consequently, the present invention also relates to the modified polyolefins that can be obtained by a process as described above, comprising acid or anhydride groups that are at least partially neutralized by metal ions, and exhibiting:

a content of products insoluble in xylene at 130° C. of less than 1%, an exponential increase in elongational viscosity as a function of time, an MFI of less than or equal to 6 dg/min [modified polyolefins (B2)].

The content of products insoluble in xylene at 130° C. can be determined by any known method. A suitable method consists in dissolving 10 g of the polyolefin in granule form in 300 ml of xylene and refluxing the whole for 2 h. The content of insoluble products is less than 1% when the solution obtained is completely transparent (i.e. no cloudy zones).

The modified polyolefins according to the invention have an MFI of less than or equal to 6, or even less than or equal to 5 dg/min. However, in order for it to remain possible to process them, their MFI will generally be greater than or equal to 0.01 dg/min, or even greater than or equal to 0.1 dg/min.

They generally also have a degree of neutralization of the acid or anhydride functions of greater than or equal to 40%, or even greater than or equal to 50% and, in certain cases, greater than or equal to 70%. This degree of neutralization is, however, less than or equal to 100%, generally less than or equal to 90%. This degree of neutralization can be measured by any known method. A method which gives good results consists in analysing the sample by IR before and after neutralization, in the knowledge that the grafted maleic anhydride in its non-hydrolysed form exhibits an adsorption band around 1790 $cm^{-1}$, the grafted maleic anhydride in its hydrolysed form has an adsorption band around 1725 $cm^{-1}$ and the grafted maleic anhydride in its neutralized form has one about 1580 $cm^{-1}$.

Although these resins exhibit a high degree of neutralization, their cation content is however low. Thus, for a cation of given nature, it is generally less than or equal to 1% by weight, or even less than or equal to 0.8% by weight (relative to the total weight of the modified polyolefin). This content may even, in certain cases be less than or equal to 0.7% in the case of $Na^+$ ions and less than or equal to 0.5% in the case of $Zn^{++}$ ions.

The modified polyolefins according to the invention have properties similar to those of the base polyolefins (whether or not they are grafted) and in particular very similar temperature resistance and crystalline properties (melting point ($T_m$) and crystallization temperature in particular, measured by the DSC (Differential Scanning Calorimetry) technique according to standard ISO FDIS 11357-3 (1999), at the second pass and with a scanning rate of 10 K/min). This implies that the difference between the $T_m$ of a grafted resin and that of its non-grafted homologue is generally less than or equal to 5° C., or even less than or equal to 3° C. Taking polymers of ethylene and/or of propylene as the starting point, this generally implies a $T_m$ of greater than 100° C.

In addition, the modified polyolefins according to the invention exhibit improved mechanical properties compared with the base polyolefins. Thus, in the case of PP homopolymer-based modified polyolefins, their tensile modulus E (measured at 23° C. according to standard ISO 527-1) is generally greater than or equal to 2000 MPa, and in the case of HDPE (high density polyethylene)-based modified resins, said modulus is greater than or equal to 1000 MPa. In addition, in the case of the PP homopolymer-based modified polyolefins, a clear improvement in mechanical strength is observed, which results in a DTUL (Deflection Temperature Under Load measured according to standard ISO 75-2 (9/1993)) of greater than or equal to 120° C. under a load of 0.45 MPa and greater than or equal to 60° C. under a load of 1.8 MPa. Finally, the creep resistance of the modified polyolefins is substantially improved compared with that of the base resins; thus for example, when measurements are carried out at 80° C. and under a load of 5 MPa, the modified polyolefins according to the invention generally exhibit a deformation after 100 h that is at least 15%, or at least 20%, and even at least 25% less than those of the base polyolefins.

The modified polyolefins according to the invention also generally exhibit an exceptional oxidation resistance (measured according to the PIO2 test). The PIO2 test for oxidation resistance consists in:

taking 20 mg of resin in the form of a pellet, thermoregulating this pellet at the desired temperature (in particular at 190° C. for the propylene-based polyolefins and at 210° C. for the ethylene-based polyolefins) under a stream of nitrogen, starting the measurement at time to under a stream of oxygen, measuring the amount of time required (in minutes) for the resin to begin degrading (oxidizing), i.e. the amount of time required for the appearance of an exotherm.

The PP-based modified polyolefins according to the prior art have a PIO2 of less than 60 min, whereas the PP-based modified polyolefins according to the invention can have a PIO2 of greater than or equal to 60 min, in certain cases even greater than or equal to 70 min, or even greater than or equal to 80 min. In the case of the PE-based modified polyolefins according to the invention, they have a PIO2 that is generally greater than or equal to 50 min, or greater than or equal to 60 min, or even greater than or equal to 75 min.

Finally, it should be noted that, as already mentioned above, the modified polyolefins according to the invention exhibit an improvement in terms of organoleptic properties and in terms of yellowing, compared to the modified polyolefins of the prior art. As regards this yellowing for example, the YI (yellow index, measured according to standards ASTM D-1925 and ASTM E-313) of the polyolefins according to the invention is generally less than or equal to 40, or even less than or equal to 30.

The modified polyolefins according to the invention find an advantageous application in the preparation of foams, in particular of high-density polypropylene foams and high-density polyethylene foams produced by foaming extrusion. In particular, the modified polyolefins find an advantageous application in the production of objects made by foaming extrusion, thermoforming or blow-moulding, in particular by 3D blow-moulding. Another field of application is that of improving adhesion in compatibilization applications, multilayer applications and sealing applications.

Moreover, the modified polyolefins according to the invention also exhibit, in certain cases, adhesive properties that are superior to those of the unmodified grafted polyolefins. Thus for example, they exhibit better adhesion in the presence of oils and of fats, on many substrates. The maximum stress measured in an adhesion test (test according to standard NFT 76-104) with these polyolefins and oily substrates (steel sheets, for example) is in fact generally at least equal to 8 MPa and the breakages observed are generally of adhesive type (according to the definition of standard NFT 76-107). Consequently, these polyolefins are suitable as adhesives, in particular in packagings for fatty products (foods, cosmetics, etc.), in tanks and pipes for hydrocarbons (petrol). In the case of the PP-based modified polyolefins, the adhesion on Al substrates (optionally surface treated) is also improved compared with that of the unmodified grafted PPs (i.e. the maximum stress in the adhesion test is also at least equal to 8 MPa and the failure is adhesive).

A subject of the present invention is also a polymeric composition that has many advantages compared with the polymeric compositions of the prior art without having the disadvantages thereof.

To this effect, the invention relates to a polymeric composition containing (A) at least one polymer, and (B) at least one modified polyolefin chosen from the modified polyolefins obtained by the process in accordance with the invention [process (P)], as described above [modified polyolefins (B1)], and the modified polyolefins that can be obtained by said process, as described above [modified polyolefins (B2)].

Thus, the invention relates to a polymeric composition containing (A) at least one polymer, and (B) at least modified polyolefin chosen from:

the modified polyolefins (B1), i.e. the polyolefins grafted with acid or anhydride groups, modified by a process according to which these groups are at least partially neutralized with at least one neutralizing agent comprising an organic salt (1) that releases an organic acid (I) during the neutralization, and the organic acid (I) derived from the neutralization of the grafted polyolefins is reacted with at least one inorganic salt (2) [process (P)], and the modified polyolefins (B2), i.e. the modified polyolefins that can be obtained by the process (P), comprising acid or anhydride groups that are at least partially neutralized by metal ions, and exhibiting a content of products insoluble in xylene at 130° C. of less than 1%, an exponential increase in elongational viscosity as a function of time, and an MFI of less than or equal to 6 dg/min.

The process (P) that is used to synthesize the modified polyolefins (B1) of the compositions according to the present invention corresponds to the same characteristics and preferences, whatever the level of preference, as those of the process (P) in accordance with the invention, which is described from the paragraph beginning with "To this effect, the present invention relates to a process for modifying a grafted polyolefin" up to the paragraph ending "the preferred stabilizer is 1,3,5-trimethyl-2,4,6-tris(3,5-t-butyl-4-hydroxybenzyl)benzene".

Similarly, the modified polyolefins (B2) of the compositions according to the present invention correspond to the same characteristics and preferences, whatever the level of preference, as those of the modified polyolefins (B2) in accordance with the invention which are described from the paragraph beginning with "Consequently, the present invention also relates to the modified polyolefins that can be obtained by a process as described above" up to the paragraph ending with "the maximum stress in the adhesion test is also at least equal to 8 MPa and the failure is adhesive".

The modified polyolefin is preferably chosen from the modified polyolefins (B1).

(A) may in particular be:

an aromatic polycondensate such as a polyphthalamide, a polyamide obtained by condensation of metaxylylenediamine and of at least one diacid, a polyamideimide, an aromatic polyester such as a liquid-crystal polyester, a polysulphone, a polyaryletherketone or a polyphenylene sulphide;

a polyadduct such as a halogenated polymer, for instance PVC, PVDC, PVDF and PTFE, a polyvinyl ester, an acrylic polymer, a polymer of styrene, such as polystyrene, a polymer of an alkadiene, such as polybutadiene, a polymer of styrene and of an alkadiene, such as SBS rubber, a styrene homopolymer, or a non-functionalized polyolefin.

(A) is preferably a non-functionalized polyolefin, i.e. a non-functionalized olefin polymer and, particularly preferably, a non-functionalized linear olefin polymer.

By way of example of linear olefins, mention be made of ethylene, propylene, 1-butene, 1-pentene, 1-hexene, 1-octene and 1-decene.

The linear olefin preferably contains from 2 to 8 carbon atoms, particularly preferably from 2 to 6 carbon atoms, and most particularly preferably from 2 to 4 carbon atoms. Excellent results have been obtained when the linear olefin is ethylene and/or propylene.

The non-functionalized polyolefin may in particular be a homopolymer of the abovementioned olefins or a copolymer of the abovementioned olefins with one or more comonomers.

The comonomers are advantageously chosen from the olefins described above, from diolefins comprising from 4 to 18 carbon atoms, such as 4-vinylcyclohexene, dicyclopentadiene, methylenenorbornene and ethylidenenorbornene, 1,3-butadiene, isoprene and 1,3-pentadiene, and from styrene monomers such as styrene and alpha-methylstyrene. Preferably, they are chosen from the linear olefins above.

The content by weight of comonomer units in the non-functionalized polyolefin of the composition according to the invention is advantageously less than 50%, preferably less than 30% and particularly preferably less than 10% by weight.

By way of examples of non-functionalized olefin copolymers, mention may be made of random copolymers of propylene (>90% by weight) and of ethylene (<10% by weight), such as the copolymer ELTEX® KS.

The non-functionalized polyolefin is particularly preferably selected from homopolymers of the abovementioned olefins, quite particularly preferably from ethylene homopolymers and propylene homopolymers, and most preferably from propylene homopolymers, such as the polypropylene ELTEX® HL.

A specific composition in accordance with the invention comprises, as polymer (A), a non-functionalized polyolefin which is a blocked copolymer, preferably a blocked copolymer comprising repeat units derived from ethylene and/or from propylene. By way of examples of block copolymers, mention may be made of AB diblock copolymers and ABA triblock copolymers, where the A blocks are blocks of polystyrene homopolymer and the B blocks are blocks of a copolymer composed, firstly, of repeat units derived from ethylene and, secondly, of repeat units derived from propylene and/or from a diolefin comprising from 4 to 18 carbon atoms, such as butadiene, that are optionally hydrogenated (for example, the repeat units derived from butadiene may be hydrogenated to butylene repeat units). As regards this specific composition according to the invention and, by exception, the content by weight of units formed from comonomers other than ethylene and propylene, of the non-functionalized polyolefin block copolymer is advantageously at least 10%, preferably at least 20% by weight; in addition, it is advantageously less than 75%, and preferably less than 50% by weight. An example of this specific composition in accordance with the invention is a composition comprising, as polymer (A), a polypropylene homopolymer and a styrene-ethylene/butylene-styrene block copolymer comprising approximately 30% by weight of styrene (commonly called SEBS rubber), and, as modified polyolefin (B), a maleic anhydride-grafted polypropylene homopolymer and a maleic anhydride-grafted SEBS rubber, both modified according to the process in accordance with the invention.

The weight of (A), relative to the total weight of the composition, is advantageously greater than 50%, preferably greater than 75%, and particularly preferably greater than 85%.

The weight of (B), relative to the total weight of the composition, is advantageously greater than 0.5%, preferably greater than 1%, particularly preferably greater than 2%.

The weight of (B), relative to the total weight of the composition, is advantageously less than 40%, preferably less than 20%, particularly preferably less than 10%, and most particularly preferably less than 6%.

The composition according to the invention can be prepared by any known process, in particular processes in solution, processes that take place in a mixer, for example a Brabender® mixer, and processes that take place in an extruder, for example a Prism® extruder. Good results are usually obtained if the compositions according to the invention are prepared by a process that takes place in an extruder.

The compositions according to the invention can optionally also contain additives that are usual in polymeric compositions, in particular additives that are usual in polyolefin compositions, in an amount preferably ranging up to 10%, particularly preferably up to 5% by weight, relative to the total weight of the composition.

By way of examples of such usual additives, mention may be made of antioxidants such as sterically hindered phenols, lubricants, fillers, dyes, pigments, nucleating agents, UV stabilizers, antacids such as calcium stearate, agents for modifying crystallinity, such as copolymers of ethylene and of n-butyl acrylate or ethyl acrylate, metal-deactivating agents and antistatic agents.

The compositions according to the invention preferably contain from 0.1 to 0.5% by weight, relative to the total weight of the composition, of a sterically hindered phenol such as 1,3,5-trimethyl-2,4,6-tris(3,5-di-t-butyl-4-hydroxybenzyl)benzene and pentaerythritol tetrakis-(3,5-di-t-butyl-4-hydroxyphenylpropionate).

The composition according to the present invention exhibits an overall level of properties that is clearly improved compared with that of the compositions of the prior art. This clear improvement results from the addition to the polymeric compositions, in particular to the compositions containing a non-functionalized polyolefin, of a modified polyolefin that is obtained or that can be obtained by the process according to the invention. The improved properties may in particular be the melt strength (exponential increase in elongational viscosity and improved low MFI, while at the same time maintaining a low content of crosslinked polymer), and also the mechanical properties, such as the tensile modulus. In addition, in the case of compositions of PP homopolymer to which as little as a few percent (for example, 5%) by weight of a PP homopolymer-based modified polyolefin have been added, a clear improvement in mechanical strength has been observed, which is reflected by an increase of close to 10° C. in the deflection temperature under load; the behaviour in the VICAT test, the impact strength and the creep resistance are themselves also substantially improved. Finally, the composition according to the invention also exhibits, in certain cases, adhesive properties that are superior to those of compositions based on non-functionalized polyolefin and free of modified polyolefin. Thus, for example, they exhibit better adhesion in the presence of oils and of fats, on many substrates. In the case of compositions containing a non-functionalized PP and a grafted PP according to the invention, the adhesion on aluminium supports (optionally surface treated) is also improved compared with that of compositions free of grafted PP.

A subject of the present invention is also an article made from a polymer or from a polymeric composition, that exhibits many advantages compared to the articles of the prior art, without exhibiting the disadvantages thereof.

To this effect, the invention relates to an article comprising either the composition in accordance with the invention, as described above, or a modified polyolefin chosen from the modified polyolefins obtained by the process in accordance with the invention [process (P)], as described above [modified polyolefins (B1)] and the modified polyolefins that can be obtained by said process, as described above [modified polyolefins (B2)].

A first preferred choice for the article according to the invention is that made from glass fibres, natural fibres and metal wires sized with a layer of the composition or of the modified polyolefin, and also from metal surfaces and non-metal surfaces coated with a layer of the composition or of the modified polyolefin.

By way of example of non-metal surfaces, mention may be made of cement surfaces, glass surfaces, stone surfaces and polymer surfaces.

A second preferred choice for the article according to the invention is that made from tubes, films, sheets, fibres, foams and blow-moulded hollow bodies made of the composition or of the modified polyolefin.

By way of examples of blow-moulded hollow bodies, mention may be made of bottles.

The tubes are advantageously intended for the oil industry, for the construction industry or for the automobile industry.

The films may in particular be food-related films that are sealable in a fatty medium or films that can be printed with aqueous inks.

A third preferred choice for the article according to the invention is that of a part for an automotive vehicle, selected from fuel tanks, fuel pipes, bumpers and dashboards.

The article in accordance with the invention has many advantages. It usually has a smaller thickness or is lighter than the articles of the same nature of the prior art. It exhibits resistance to soiling, to scratching, to abrasion and to graffiti. When the article according to the invention is a film, the latter exhibits high tear resistance and can be bonded in soiled environments.

Finally, a last aspect of the invention envisages the use either of the composition in accordance with the present invention, or of a modified polyolefin chosen from the modified polyolefins obtained by the process in accordance with the invention [process (P)], as described above [modified polyolefins (B1)] and the modified polyolefins that can be obtained by said process, as described above [modified polyolefins (B2)], as an agent for compatibilization and/or for dispersion of a polyolefin with a polymer or a filler that is incompatible with the polyolefin.

By way of examples of polymers that are incompatible with the polyolefins, mention may be made of epoxy resins, fluorinated resins, and in particular poly(vinylidene fluoride), polyamides and polyesters.

Preferably, the composition according to the invention or the polyolefin chosen as indicated above is used as an agent for compatibilization and/or for dispersion of a polyolefin in an epoxy resin.

Incompatible fillers are, for example, natural fibres, such as flax, hemp, jute and cellulose, and also glass fibres, glass, silica, talc, calcium carbonate and carbon black. Metal substrates are, for example, steel or aluminium.

The following examples are intended to illustrate the invention without, however, limiting the scope thereof.

REFERENCE EXAMPLE 1 (NOT IN ACCORDANCE WITH THE INVENTION) AND EXAMPLE 2 (IN ACCORDANCE WITH THE INVENTION)

Propylene (PP)-based Grafted Polyolefins Neutralized with Zn Acetate

The following were used:

a Priex® 20070 resin, a polypropylene chemically modified by Solvay. It is a PP grafted with maleic anhydride in a proportion of 0.1% by weight, which has an $MFI_{2.16\ kg,\ 230°\ C.}$ of 64 g/10 min;

solutions of Zn acetate $(Zn(Ac)_2)$ and of $Na_2CO_3$ at 200 g/l, in respective amounts of 3 mol. eq. (molar equivalents relative to the number of carboxylic acid functions of the resin) for the $Zn(Ac)_2$ and of 0 mol. eq. (Counter-example 1) and 2 mol. eq. (Example 2) for the $Na_2CO_3$;

a Clextral model BC 21 extruder, which is a co-rotating twin-screw extruder, diameter 25 mm and length 1000 mm (L/D=40). The barrel consists of 10 independent zones (Z1 to Z10) and also a converging flow region and a die;

a screw speed of 200 rpm, a throughput of 10 kg/h and the following temperature profile: Z1 (resin feed): 70° C.; Z2: 170° C.; Z3 (melting) and Z4 (injection $Zn(Ac)_2$): 200° C.; Z5 to Z8 (reaction, degassing at atmospheric pressure, reaction, degassing under vacuum at a set pressure of 2 mbar): 240° C.; Z9: 230° C.; Z10: 220° C.; converging flow region and die: 220° C.;

high-pressure injectors for the injection, respectively, of $Zn(Ac)_2$ in Z4 and of $Na_2CO_3$ in Z7, where appropriate (example 2).

The elongational viscosity of the modified resins obtained was determined using a rheometer sold by Rheometrics under the name RME (Rheometrics Elongational Rheometer For Melts). The sample (55×9×2 mm) was obtained by extrusion and was subjected to a relaxation procedure and then to measurement of the variation, at 190° C., in elongational melt viscosity (expressed in kPa.s) as a function of time (expressed in s) for an elongation rate (expressed in $s^{-1}$) of 1.

In the two cases (Counter-example 1 and Example 2), resins exhibiting an elongational hardening (the elongational viscosity ranging from 0 to more than 1000 kPa.s after 2 to 3 s) were obtained.

In addition, the content of products insoluble in xylene at 130° C. (determined by the method described above) was measured for these two resins, and is less than 1 percent.

The MFI (2.16 kg, 230° C.) is 8.6 dg/min for the resin derived from Counter-example 1, and 0.5 dg/min for the resin derived from Example 2. In addition, the latter has a whiter appearance and a lack of acetic acid odour compared with the former.

Reference example 1 was repeated, increasing the dose of $Zn(Ac)_2$ to values of 4 and 5 mol. eq., respectively, but the value of the MFI remained substantially the same.

REFERENCE EXAMPLE 3 AND EXAMPLES 4 AND 5 (IN ACCORDANCE WITH THE INVENTION)

Propylene (PP)-based Grafted Polyolefins Neutralized with Na Lactate (NaLac)

The same starting resin and the same experimental parameters as in the previous examples were used. However, the neutralizing agent was this time NaLac (sodium lactate: mixture of D- and L-isomer from Acros: 256.4 ml of solution at 60% by weight per litre of aqueous solution), used in a proportion of 5 mol. eq. The $Na_2CO_3$ was used in a proportion of 0 mol. eq. (Counter-example 3), 1 mol. eq. (Example 4) and 2 mol. eq. (Example 5). The MFI (2.16 kg, 230° C.) of the modified resins obtained was 23.2 dg/min, 5 dg/min and 0.5 dg/min, respectively. These resins all exhibit elongational hardening and have a content of products insoluble in xylene at 130° C. of less than 1%.

REFERENCE EXAMPLE 6 AND EXAMPLES 7 AND 8 (IN ACCORDANCE WITH THE INVENTION)

Propylene (PP)-based Grafted Polyolefins Neutralized with Zn Acetate

These examples were undertaken with reactants and operating conditions identical to those of Examples 1 and 2.

The amounts of reactants used and also the results obtained appear in the table below:

| Ex. | $Zn(Ac)_2$ | $Na_2CO_3$ | Zn | N | MFI | $T_m$ | $T_c$ | PIO2 | Odour |
|---|---|---|---|---|---|---|---|---|---|
| C6 | 3.0 | 0 | 2 | 65 | 9.8 | 163 | 113 | >60 | 1 |
| 7 | 2.7 | 1.7 | 1.9 | 68 | 1.7 | 164 | 122 | >60 | 0 |
| 8 | 2.5 | 1.5 | 1.7 | 59 | 3.3 | 165 | 122 | >60 | 0 |

In this table:

Zn(Ac)$_2$ is the amount of Zn(Ac)$_2$ used, expressed in mol. eq. Idem for Na$_2$CO$_3$ Zn is the content of Zn in the modified resin, measured by X-ray fluorescence and expressed in g/kg N is the percentage of neutralized MA functions, measured by IR spectrometry The MFI is measured at 230° C., under 2.16 kg, and is expressed in dg/min $T_m$ and $T_c$ are, respectively, the melting point and the crystallization temperature, measured by DSC PIO2 is the oxidation resistance as defined above Odour: 0=no odour, 1=slight odour; 2=pronounced odour.

The resins derived from these examples all exhibit elongational hardening and have a content of products insoluble in xylene at 130° C. of less than 1%.

The resin derived from Example 7 was subjected to supplementary determinations: its modulus E is 2206 MPa, its YI is 29.4, and its DTUL is 125° C. under 0.45 MPa and 64° C. under 1.8 MPa (see definitions and methods for measuring these parameters, above), and it has a favourable organoleptic assessment (taste tests after soaking of water in modified polyolefin-based containers, by comparison with a reference water; the favourable grade corresponds to a zero or weak taste).

REFERENCE EXAMPLE 9 AND EXAMPLES 10 TO 15

Ethylene (PE)-based Grafted Polyolefins Neutralized with NaLac

These examples were undertaken with reactants and operating conditions identical to those of Examples 3 to 5, but with a Priex® 12030 resin from Solvay as starting resin. It is an HDPE grafted with maleic anhydride in a proportion of 0.14% by weight, that exhibits an MFI$_{5\ kg,\ 8/2,\ 190°\ C.}$ of 30 g/10 min.

The amounts of reactants used and also the results obtained appear in the table below:

| Ex. | NaLac | Na$_2$CO$_3$ | Na | N | MFI | $T_m$ | $T_c$ | PIO2 | Odour |
|---|---|---|---|---|---|---|---|---|---|
| C9 | 0.5 | 0 | — | — | 20.0 | — | — | — | — |
| 10 | 0.5 | 1 | — | — | 2.4 | — | — | — | — |
| 11 | 0.75 | 1 | — | — | 2.4 | — | — | — | — |
| 12 | 1 | 1 | — | — | 2.5 | — | — | — | — |
| 13 | 0.5 | 1.5 | — | — | 1.8 | — | — | — | — |
| 14 | 0.5 | 1.6 | 1.4 | 64 | 1.4 | 135 | 113 | >60 | 0 |
| 15 | 0.4 | 0.5 | 0.7 | 43 | 4.3 | 135 | 113 | >60 | 0 |

In this table:

NaLac is the amount of NaLac used, expressed in mol. eq. Idem for Na$_2$CO$_3$

Na is the content of Na in the modified resin, measured by X-ray fluorescence, and expressed in g/kg N is the percentage of neutralized MA functions, measured by IR spectrometry The MFI is measured at 230° C., under 5 kg, and is expressed in dg/min $T_m$ and $T_c$ are, respectively, the melting point and the crystallization temperature, measured by DSC PIO2 is the oxidation resistance as defined above Odour: 0=no odour; 1=slight odour; 2=pronounced odour.

The resins derived from Examples 14 and 15 were subjected to supplementary determinations, which showed that: they both exhibit elongational hardening, they have a content of products insoluble in xylene at 130° C. of less than 1%, and they have a favourable organoleptic assessment;

they have, respectively, a modulus E of 1009 and 1033 MPa and a YI of 27 and 22.9.

EXAMPLE 16 (IN ACCORDANCE WITH THE INVENTION)

Propylene (PP)-based Grafted Polyolefin Neutralized with Sodium Lactate (NaLac)

A Priex® 20015 resin, which is a polypropylene homopolymer chemically modified by Solvay, was used as starting resin. It is a PP grafted with maleic anhydride in the proportion of 0.5% by weight, that exhibits an MFI$_{2.16\ kg,\ 230°\ C.}$ of 15 g/10 min.

The neutralizing agent was NaLac (sodium lactate: mixture of D- and L-isomer from Acros: 256.4 ml of solution at 60% by weight per litre of aqueous solution), used in a proportion of 5 mol. eq.

The Na$_2$CO$_3$ was used in a proportion of 2 molar equivalents.

The experimental parameters applied were the same as those applied for the previous examples (cf. Examples 1 and 2 for details).

The MFI (2.16 kg, 230° C.) of the modified resin thus obtained was 1 g/10 min, and it had a sodium content of 0.88 g/kg. Its melting point was 167° C.

REFERENCE EXAMPLE 17 (NOT IN ACCORDANCE WITH THE INVENTION) AND EXAMPLE 18 (IN ACCORDANCE WITH THE INVENTION)

Composition Comprising a Non-functionalized Polypropylene Respectively without/with Additive Consisting of Propylene (PP)-based Grafted Polyolefin Neutralized with Sodium Lactate (NaLac)

A composition in the form of granules, composed of polypropylene homopolymer Eltex® P HL and of a sterically hindered phenol stabilizer (composition sold by BP) was used as reference composition, hereinafter composition (CR17). This composition had an MFI (2.16 kg, 230° C.) of 2.5 g/10 min, a melting point of 161° C. and a density of 900 kg/m$^3$.

A composition in accordance with the invention, hereinafter composition (CI18), composed of 95% by weight of the composition (CR17) and of 5% by weight of the PP-based grafted polyolefin neutralized with NaLac, synthesized in Example 16, was prepared. To this effect, a Prism® co-rotating twin-screw extruder, diameter 15 mm and length 24 cm (i.e. a length to diameter ratio of 16), the barrel of which consists of 2 independent zones (Z1 and Z2) and also a converging flow region and a hole die, was used. A screw speed of 200 rpm and a throughput of 2 kg/h were applied, and the temperature profile was as follows: Z1 (feed zone): 230° C.; Z2: 230° C.; converging flow region and die: 230° C.

Tensile Test at 23° C.

This test was carried out according to standards ISO 527-1 and 2; the modulus speed was 1 mm/min; the test speed was 50 mm/min; the distance between the tools was 115 mm; the standard gauge length was 50 mm; the test piece type was the ISO 1B (115) type; the load cell was of the "1 kN tension—without an oven" type; the extensometer was a Zwick Multisens and Traverse sensor; the temperature was 23° C.

The results given in the following table were obtained:

|  | Composition (CR17) | Composition (CI18) |
|---|---|---|
| Modulus 0.05-0.25% (in MPa) | 1749 | 2127 |
| Yield elongation (in %) | 8.5 | 7.0 |
| Yield stress (in MPa) | 37.0 | 39.3 |
| Tensile strength (in MPa) | 14.9 | 24.3 |

Determination of the Deflection Temperature Under Load (DTUL)

This determination was carried out according to standard ISO 75-2 (9/1993) under a load either of 0.45 MPa, or of 1.8 MPa. An increase in temperature of 120° C./h was effected; the preload was 50 g; the heat transfer fluid used was silicone oil; test pieces that had been injection moulded, trimmed and cut to a length of 120±10 mm were used; the test pieces were placed on the side; the distance between the supports was 100±2 mm.

The results given in the table below were obtained:

|  | Composition (CR17) | Composition (CI18) |
|---|---|---|
| DTUL under a load of 0.45 MPa (in ° C.) | 110 | 119 |
| DTUL under a load of 1.8 MPa (in ° C.) | 59 | 68 |

VICAT test. The VICAT test was carried out according to standard ISO 306 (1987). Both for the 10 N VICAT measurement and for the 50 N VICAT measurement, the penetration was 1 mm.

The results given in the table below were obtained:

|  | Composition (CR17) | Composition (CI18) |
|---|---|---|
| Softening temperature 10 N VICAT (in ° C.) | 157 | 159 |
| Softening temperature 50 N VICAT (in ° C.) | 101 | 107 |

Determination of impact strength—instrumented falling weights (IFW) test. The IFW test was carried out according to standard ISO 7765-2. The temperature was 23° C.; the theoretical energy and speed of the striker were, respectively, 247.5 J and 4.43 m/s; the mass of the striker was 25.24 kg; the drop height was 1 m; the diameters of the striker and of the support were, respectively, 20 and 40 mm.

The results given in the table below were obtained:

|  | Composition (CR17) | Composition (CI18) |
|---|---|---|
| Maximum strength (in N) | 445 | 688 |
| Displacement at maximum strength (in mm) | 3.3 | 5.2 |
| Energy at maximum force (in J) | 0.78 | 1.73 |
| Toughness (in J/mm) | 0.47 | 0.87 |

Creep test. This test was carried out under a stress of 10 MPa on an ISO1A test piece and at a temperature of 23° C.

The results given in the table below were obtained:

|  | Composition (CR17) | Composition (CI18) |
|---|---|---|
| Modulus after 0.01 h (in MPa) | 1756 | 1914 |
| Modulus after 0.1 h (in MPa) | 1420 | 1561 |
| Modulus after 1 h (in MPa) | 1113 | 1254 |
| Modulus after 10 h (in MPa) | 787 | 918 |
| Modulus after 1 day (in MPa) | 680 | 807 |
| Modulus after 100 h (in MPa) | 548 | 652 |

EXAMPLE 19 (IN ACCORDANCE WITH THE INVENTION

Propylene (PP)-based Grafted Polyolefin Neutralized with Sodium Lactate (NaLac)

A Priex® 20093 resin, which is a polypropylene homopolymer chemically modified by Solvay, was used as starting resin. It is a PP grafted with maleic anhydride in a proportion of 0.26% by weight, that has a weight-average molecular mass of 75 000.

The NaLac neutralizing agent and the $Na_2CO_3$ were used in the same amount and in the same way as in Example 16.

The experimental parameters applied were also the same as those applied for the previous examples.

The MFI (2.16 kg, 230° C.) of the modified resin thus obtained was 1.4 g/10 min, and it had a sodium content of 6.6 g/kg. Its melting point was 135° C.

REFERENCE EXAMPLE 20 (NOT IN ACCORDANCE WITH THE INVENTION) AND EXAMPLE 21 (IN ACCORDANCE WITH THE INVENTION)

Composition Comprising a Non-functionalized Polypropylene Respectively with/without Additive Consisting of Polypropylene (PP)-based Grafted Polyolefin Neutralized with Sodium Lactate (NaLac)

A composition (CR20) identical in all respects to the composition (CR17) was used as reference composition.

A composition in accordance with the invention, hereinafter composition (CI21), composed of 95% by weight of the composition (CR20) and of 5% by weight of the PP-based grafted polyolefin neutralized with NaLac, synthesized in Example 19, was prepared.

Test to evaluate the cohesion and the adhesion on various substrates. These tests were carried out according to standard NF T 76-104.

The shear test pieces were prepared by compression moulding, at a temperature of 230° C. and under a pressure of 20 bar:

between two aluminium plates immersed beforehand for 10 minutes in a sulphochromic acid bath, or between two aluminium plates immersed beforehand for 10 minutes in an alkaline bath, or else between two steel plates immersed beforehand for 10 minutes in a sulphochromic acid bath.

The tensile strength of the shear test pieces was determined in a shear test carried out using an MTS 50LP machine equipped with a 50 kN sensor.

The following results were obtained:

| Tensile strength (in MPa) for the substrate/bath couple = | Composition (CR20) | Composition (CI21) |
|---|---|---|
| Aluminium substrate/sulphochromic acid bath | 1 | 7 |
| Aluminium substrate/alkaline bath | 0.4 | 4 |
| Steel substrate/sulphochromic acid bath | 2 | 7 |

EXAMPLES 22 TO 24 (IN ACCORDANCE WITH THE INVENTION)

Grafted, Block Copolymer Polyolefins Neutralized with Sodium Lactate (NaLac)

The following were used:

a Kraton® FG1901X styrene-ethylene/butylene-styrene block copolymer resin containing approximately 30% by weight of polystyrene blocks, grafted with maleic anhydride, sold by Kraton Polymers. According to determinations made by us, the resin used had a degree of maleic anhydride grafting of approximately 1.1% by weight and an $MFI_{2.16\ kg,\ 230°\ C.}$ of 6.2 g/10 min, solutions of sodium lactate and of sodium carbonate at 200 g/l, in respective amounts of 0.129 (Example 22), 0.258 (Example 23) and 0.323 (Example 24) theoretical mol. eq. (molar equivalents relative to the number of carboxylic acid functions of the resin) for, firstly, the sodium lactate, and of 0.258 (Example 22), 0.517 (Example 23) and 0.647 (Example 24) theoretical mol. eq. (molar equivalents relative to the number of carboxylic acid functions of the resin) for, secondly, the $Na_2CO_3$, a Clextral model BC 21 extruder, which is a co-rotating twin-screw extruder, diameter 25 mm and length 1200 mm (L/D=40), with a barrel consisting of 12 independent zones (Z1 to Z12) and also of a converging flow region and a die, a screw speed of 300 rpm, a throughput of 3 kg/h and the following temperature profile: Z1 (resin feed): 100° C.; Z2 to Z4(melting): Z2: 200° C.; Z3: 220° C.; Z4: 230° C.; Z5 (co-injection of NaLac+$Na_2CO_3$): 220° C.; Z6 to Z10 (reaction, degassing at atmospheric pressure, reaction, degassing under vacuum at a set temperature of 2 mbar): 240 except Z10: 220° C.; Z11 and Z12: 220° C.; converging flow region and die: 220° C., a high pressure injecting device for co-injecting the NaLac+$Na_2CO_3$ in Z5.

Modified resins having an $MFI_{21.6\ kg,\ 230°\ C.}$ of 31 g/10 min for Example 22, of 7.7 g/10 min for Example 23 and of 3.2 g/10 min for Example 24 were obtained.

It was noted that, the greater the increase in the dose of NaLac+$Na_2CO_3$, the greater the decrease in the yellow index of the polymer obtained (the yellow index on granules according to standards ASTM D-1925 and ASTM E-313 was 38 for Example 22, 28 for Example 23, and 27 for Example 24).

The Na contents (measured by FX) were, respectively, 2.0 g/kg for Example 22, 3.9 g/kg for Example 23, and 4.6 g/kg for Example 24.

EXAMPLES 25 TO 27 (IN ACCORDANCE WITH THE INVENTION)

Compositions Comprising a Grafted Block Copolymer Polyolefin Neutralized with Sodium Lactate (NaLac)

Compositions in accordance with the invention, hereinafter compositions (CI22 to CI24) were prepared, which compositions were composed of:

57% by weight of polypropylene homopolymer Eltex® P HL stabilized with sterically hindered phenol (sold by BP), having an $MFI_{2.16\ kg,\ 230°\ C.}$ of 2.5 g/10 min, a melting point of 161° C. and a density of 900 kg/m³, 3% by weight of the chemically modified grafted polypropylene homopolymer of Example 16, 3% by weight of the polymer synthesized in Example 22 (CI22), 23 (CI23) or 24 (CI24), and 37% by weight of polymer Kraton® G 1652, which is a styrene-ethylene/butylene-styrene non-functionalized block copolymer containing approximately 30% by weight of polystyrene blocks, sold by Kraton Polymers.

The compositions thus prepared exhibit an advantageous combination of properties.

The invention claimed is:

1. A process for modifying a polyolefin grafted with acid or anhydride groups, by at least partial neutralization of these groups with at least one neutralizing agent comprising an organic salt (1) that releases an organic acid (I) during the neutralization, wherein the organic acid (I) derived from the neutralization of the grafted polyolefin is reacted with at least one inorganic salt (2) to form an inorganic acid (II) and an organic salt (3), and eliminating the inorganic acid by decomposition to form a gas.

2. The process according to claim 1, wherein the grafted polyolefin is selected from the group consisting of polymers of ethylene and of propylene, grafted with maleic anhydride.

3. The process according to claim 1, wherein the grafted polyolefin is a grafted block copolymer.

4. The process according to claim 1, wherein the organic salt (1) is liquid at the processing temperature.

5. The process according to claim 4, wherein the organic salt (1) is selected from the group consisting of Zn acetate and Na lactate.

6. The process according to claim 5, wherein the organic salt (1) and the inorganic salt (2) are introduced into the grafted polyolefin:
   simultaneously when the organic salt (1) is Na lactate;
   in a deferred way when the organic salt (1) is Zn acetate.

7. The process according to claim 1, wherein the organic salt (1) is introduced into the grafted polyolefin in the form of an aqueous solution.

8. The process according to claim 1, wherein the inorganic salt (2) is selected from the group consisting of alkali metal carbonates, alkaline earth metal carbonates and rare earth metal carbonates.

9. The process according to claim 1, wherein the inorganic salt (2) is introduced into the grafted polyolefin in the form of an aqueous solution.

10. A process for modifying a polyolefin grafted with one or more of an acid and an anhydride group, comprising:
   at least partially neutralizing the acid and anhydride groups with at least one neutralizing agent comprising a first organic salt to form an at least partially neutralized polyolefin composition, wherein during the neutralizing the organic salt forms an organic acid; and reacting the organic acid formed during the neutralizing with at least one inorganic salt to form an inorganic acid and a second organic salt;

decomposing the inorganic acid to form a gas; and releasing the gas from the neutralized polyolefin composition.

11. The process of claim 1, wherein the partial neutralization is carried out in an extruder in which the polyolefin is present in the liquid form.

12. The process of claim 1, wherein eliminating the inorganic acid by decomposition shifts the neutralization reaction towards full neutralization of the polyolefin.

13. The process of claim 10, wherein the releasing shifts the neutralization equilibrium towards full neutralization of the polyolefin.

14. The process of claim 10, wherein the releasing forms an at least partially neutralized polymer composition that is free of inorganic acid.

15. The process according to claim 1, wherein the polyolefin is fully neutralized with the neutralizing agent and the organic acid (I) formed during the neutralizing of the polyolefin is fully reacted with the inorganic salt (2).

16. The process of claim 10, wherein the neutralizing is carried out with an amount of the first organic salt to completely neutralize the acid and anhydride groups of the polyolefin composition, and the organic acid is reacted with an amount of the inorganic salt to completely convert the organic acid to the inorganic acid and the second organic salt.

17. The process of claim 10, wherein the neutralizing is carried out with the first organic salt in an amount that is at least equimolar with the acid and anhydride groups of the polyolefin, and the organic acid is reacted with an amount of the inorganic salt that is at least equimolar with the amount of the organic acid.

* * * * *